United States Patent
Araki et al.

(10) Patent No.: US 11,095,243 B2
(45) Date of Patent: Aug. 17, 2021

(54) MOTOR CONTROL SYSTEM AND ELECTRIC VEHICLE

(71) Applicant: Hitachi Automotive Systems, Ltd., Hitachinaka (JP)

(72) Inventors: Takahiro Araki, Tokyo (JP); Hideki Miyazaki, Hitachinaka (JP); Toshisada Mitsui, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 44 days.

(21) Appl. No.: 16/627,908

(22) PCT Filed: May 24, 2018

(86) PCT No.: PCT/JP2018/019944
§ 371 (c)(1),
(2) Date: Dec. 31, 2019

(87) PCT Pub. No.: WO2019/008932
PCT Pub. Date: Jan. 10, 2019

(65) Prior Publication Data
US 2021/0152116 A1 May 20, 2021

(30) Foreign Application Priority Data
Jul. 7, 2017 (JP) ............................. JP2017-133845

(51) Int. Cl.
*H02P 27/08* (2006.01)
*H02P 25/024* (2016.01)
(Continued)

(52) U.S. Cl.
CPC ........ *H02P 27/08* (2013.01); *H02M 7/53871* (2013.01); *H02P 21/22* (2016.02); *H02P 25/024* (2016.02); *B60L 15/00* (2013.01)

(58) Field of Classification Search
CPC ...... H02M 7/48; H02P 25/022; H02P 25/024; H02P 27/04; H02P 27/06; H02P 1/00;
(Continued)

(56) References Cited

U.S. PATENT DOCUMENTS 9,071,186 B2 * 6/2015 Wu .......................... B60L 1/00
2018/0375454 A1 12/2018 Araki et al.

FOREIGN PATENT DOCUMENTS

CN 102843090 A 12/2012
JP 6-101958 B2 12/1994
(Continued)

OTHER PUBLICATIONS

International Search Report (PCT/ISA/210) issued in PCT Application No. PCT/JP2018/019944 dated Aug. 28, 2018 with English translation (three (3) pages).
(Continued)

*Primary Examiner* — Antony M Paul
(74) *Attorney, Agent, or Firm* — Crowell & Moring LLP

(57) ABSTRACT

Pulsating current (ripple) is generated in a zero-phase current to increase a loss. A motor control system includes an inverter which drives a motor which includes windings separately wound around each phase and an inverter control unit which generates an output voltage pulse corresponding to each phase to control the inverter on the basis of a torque command value and a rotor position of the motor. The inverter control unit divides the output voltage pulse of at least one phase of the output voltage pulses into several pulses during one period of the output voltage pulse such that a zero-phase voltage of only one of positive and negative polarities is output several times from the motor in the one pulse period.

5 Claims, 12 Drawing Sheets

(51) Int. Cl.
*H02P 21/22* (2016.01)
*H02M 7/5387* (2007.01)
*B60L 15/00* (2006.01)

(58) Field of Classification Search
CPC ...... H02P 1/04; H02P 1/46; H02P 1/12; H02P 3/00; H02P 6/00; H02P 6/08; H02P 6/10; H02P 21/00; H02P 6/187; H02P 6/12; H02P 6/06; H02P 6/16; H02P 6/188; H02P 6/30; H02P 6/14; H02P 6/04; H02P 1/24; H02P 1/16; H02P 9/00; H02P 21/0003; H02P 21/0021; H02P 21/12; H02P 21/18; H02P 21/20; H02P 21/24; H02P 23/00; H02P 23/0004; H02P 23/0027; H02P 23/0086; H02P 23/18; H02P 25/00; H02P 27/00; H02P 23/30; H02P 27/045; H02P 27/085
See application file for complete search history.

(56) References Cited

FOREIGN PATENT DOCUMENTS

| | | |
|---|---|---|
| JP | 2003-312517 A | 11/2003 |
| JP | 2010-284018 A | 12/2010 |
| WO | WO 2017/090350 A1 | 6/2017 |

OTHER PUBLICATIONS

Japanese-language Written Opinion (PCT/ISA/237) issued in PCT Application No. PCT/JP2018/019944 dated Aug. 28, 2018 (four (4) pages).

\* cited by examiner

MOTOR CONTROL SYSTEM AND ELECTRIC VEHICLE

TECHNICAL FIELD

The present invention relates to a motor control system and an electric vehicle.

BACKGROUND ART

A hybrid automobile and an electric automobile are required to improve the power of a motor from a viewpoint of the improvement of a driving force. In response to these requests, a motor in which three-phase windings are configured independently is taken into consideration. However, since a neutral point is not connected, the zero-phase current is overlapped with the driving current which drives the motor, and a loss such as a copper loss is increased.

PTL 1 discloses a high-speed torque control device of an induction motor in which an energizing mode of the inverter of first and second voltage types is selected to reduce a current value of the zero-phase current. The device suppresses the zero-phase current, and reduces a loss.

CITATION LIST

Patent Literature

PTL 1: JP 6-101958 B2

SUMMARY OF INVENTION

Technical Problem

In a method disclosed in PTL 1, pulsating current (ripple) is generated in the zero-phase current to increase a loss.

Solution to Problem

A motor control system according to the invention includes an inverter which drives a motor which includes windings separately wound around each phase, and an inverter control unit which generates an output voltage pulse corresponding to each phase to control the inverter based on a torque command value and a rotor position of the motor. The inverter control unit divides the output voltage pulse of at least one phase of the output voltage pulses into several pulses during one pulse of the output voltage pulse such that a zero-phase voltage of only one of positive and negative polarities is output several times from the motor in one pulse period.

An electric vehicle according to the invention includes the motor control system and the motor which is driven by the motor control system.

Advantageous Effects of Invention

According to the invention, it is possible to suppress ripples generated in a zero-phase current to reduce a loss.

DESCRIPTION OF EMBODIMENTS

First Embodiment

Hereinafter, a first embodiment will be described with reference to FIGS. 1 to 6.

Figure 1:
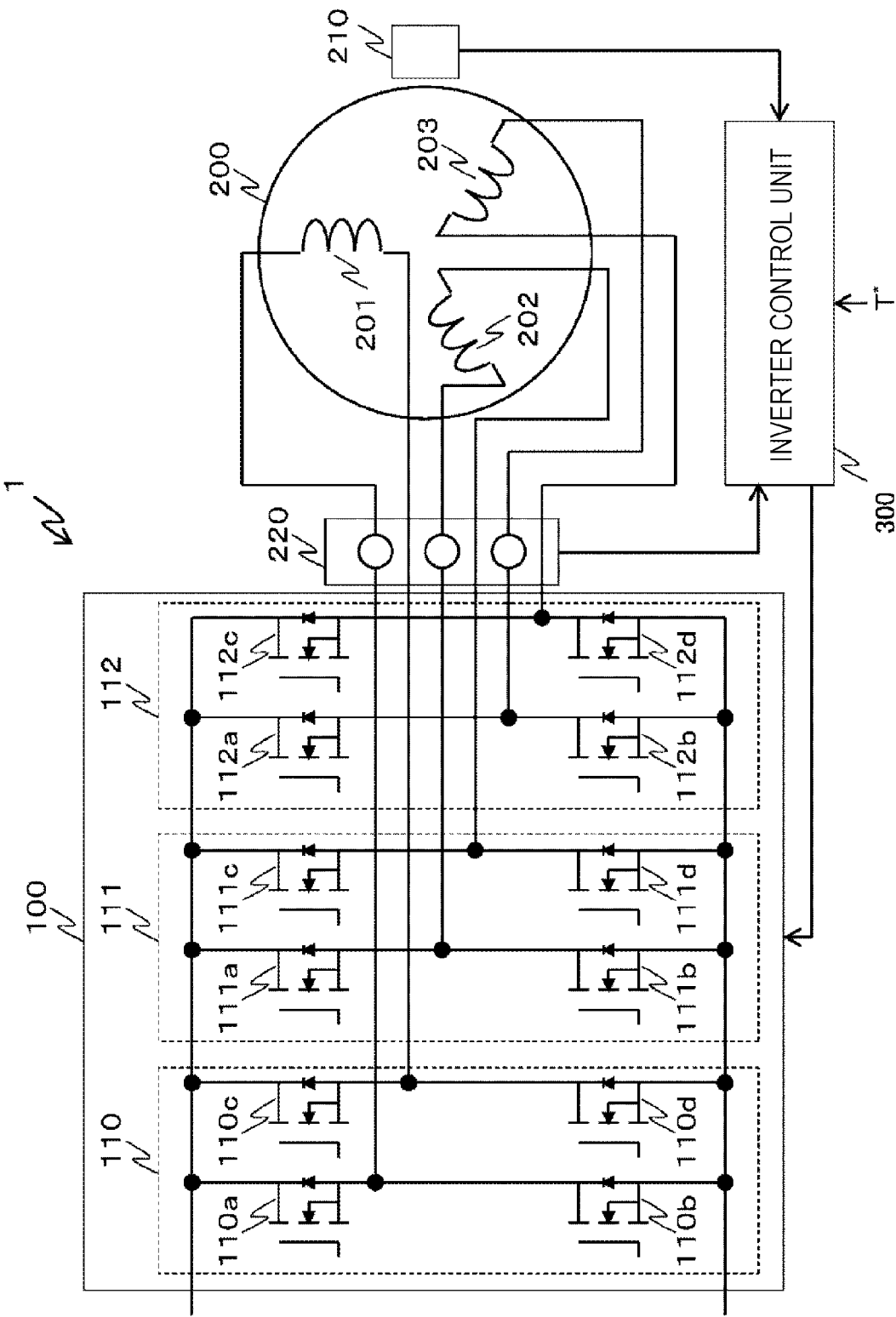
FIG. 1 is a diagram illustrating a configuration of a motor control system according to a first embodiment.

FIG. 1 is a diagram illustrating a configuration of a motor control system 1 according to the first embodiment.

The motor control system 1 includes an inverter 100 and an inverter control unit 300. The motor control system 1 controls the driving of the motor 200, detects the position of a rotor of the motor 200 by a position sensor 210, and detects the current flowing to the motor 200 by a current sensor 220.

The inverter 100 is configured by a U-phase full-bridge inverter 110, a V-phase full-bridge inverter 111, and a W-phase full-bridge inverter 112. The U-phase full-bridge inverter 110, the V-phase full-bridge inverter 111, and the W-phase full-bridge inverter 112 are connected in parallel to a DC power source (not illustrated).

The U-phase full-bridge inverter 110 is configured by switching elements 110a to 110d. The switching element 110a is disposed in a U-phase left-leg upper arm. The switching element 110b is disposed in a U-phase left-leg lower arm. The switching element 110c is disposed in a U-phase right-leg upper arm. The switching element 110d is disposed in a U-phase right-leg lower arm.

The V-phase full-bridge inverter 111 is configured by switching elements 111a to 111d. The switching element 111a is disposed in a V-phase left-leg upper arm. The switching element 111b is disposed in a V-phase left-leg lower arm. The switching element 111c is disposed in a V-phase right-leg upper arm. The switching element 111d is disposed in a V-phase right-leg lower arm.

The W-phase full-bridge inverter 112 is configured by switching elements 112a to 112d. The switching element 112a is disposed in a W-phase left-leg upper arm. The switching element 112b is disposed in a W-phase left-leg lower arm. The switching element 112c is disposed in a W-phase right-leg upper arm. The switching element 112d is disposed in a W-phase right-leg lower arm.

The switching elements 110a to 110d, the switching elements 111a to 111d, and the switching elements 112a to 112d are configured by combining a metal oxide film field effect transistor (MOSFET), an insulated-gate bipolar transistor (IGBT), or the like, and a diode. In this embodiment, the description will be given about a configuration using the MOSFET and the diode.

An output voltage pulse generated by the inverter control unit 300 is output to the inverter 100. The switching elements 110a to 110d, the switching elements 111a to 111d, and the switching elements 112a to 112d are controlled on and off on the basis of the output voltage pulse. With this configuration, the DC voltage applied from the DC power source (not illustrated) is converted into an AC voltage. The converted AC voltage is applied to 3-phase windings 201 to 203 which are wound around a stator of a motor 200, and generates a 3-phase AC current. The 3-phase AC current generates a rotation magnetic field in the motor 200, and rotates of the rotor of the motor 200.

The motor 200 is configured by a synchronous motor with embedded magnets of which the neutral point is not connected, and the like. A U-phase winding 201 wounded around the stator of the motor 200 is connected to the output terminal of the U-phase full-bridge inverter 110. A V-phase winding 202 wounded around the stator of the motor 200 is connected to the output terminal of the V-phase full-bridge inverter 111. A W-phase winding 203 wounded around the stator of the motor 200 is connected to the output terminal of the W-phase full-bridge inverter 112. Since the neutral point of the motor 200 is not connected, the currents flowing to the U-phase winding 201, the V-phase winding 202, and the W-phase winding 203 can be independently controlled.

The position sensor 210 detects the position of the rotor of the motor 200, and outputs the detected rotor position θ to the inverter control unit 300.

The current sensor 220 detects the currents flowing to the U-phase winding 201, the V-phase winding 202, and the W-phase winding 203 which are wounded around the stator of the motor 200, and outputs the detected three-phase currents $i_u$, $i_v$, and $i_w$ to the inverter control unit 300.

The inverter control unit 300 outputs the output voltage pulse to the inverter 100 on the basis of a torque command value T from a vehicle controller (not illustrated), the three-phase currents $i_u$, $i_v$, and $i_w$ detected by the current sensor 220, and the rotor position θ detected by the position sensor 210.

Figure 2:
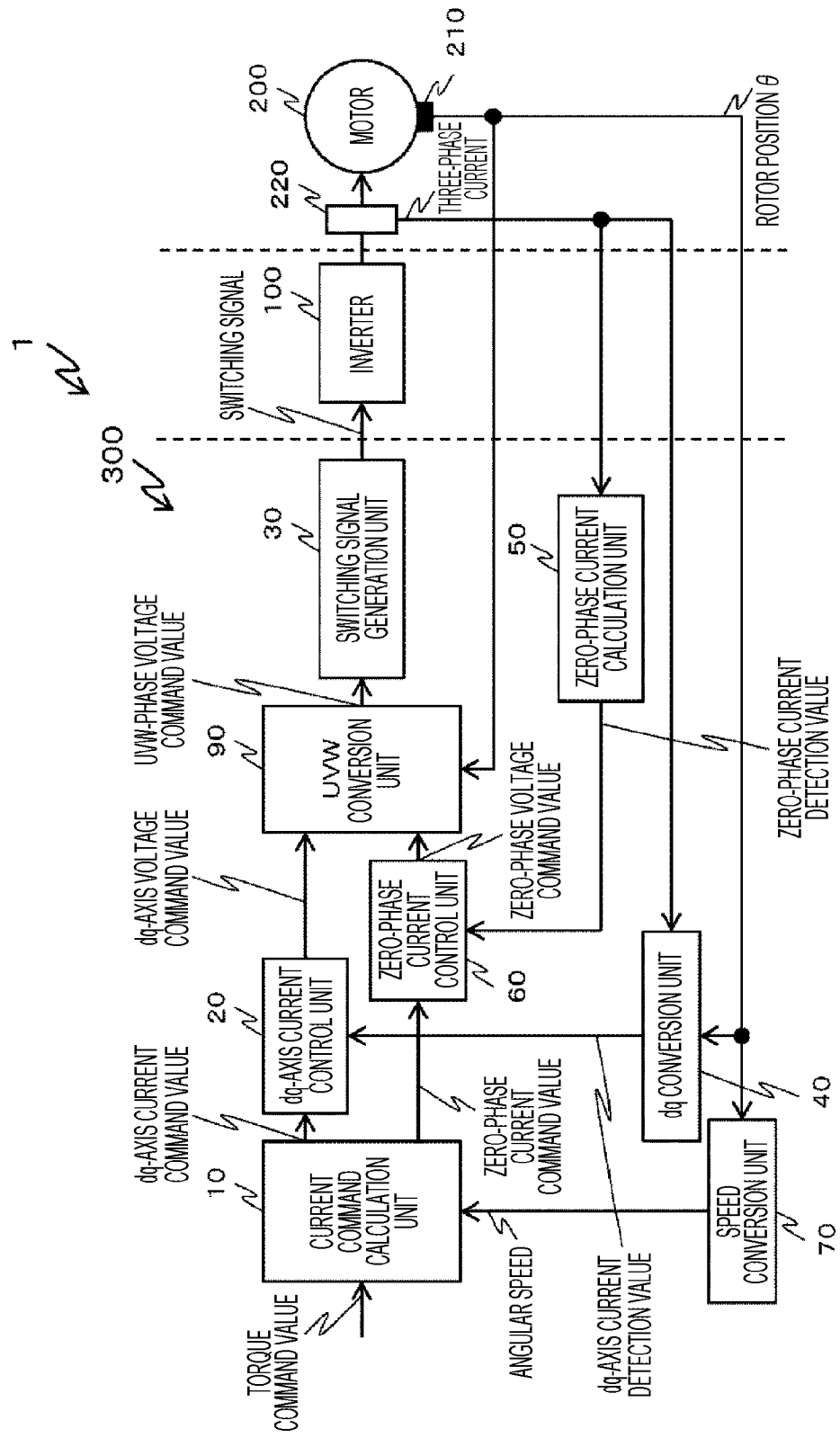
FIG. 2 is a diagram illustrating a configuration of an inverter control unit according to the first embodiment.

FIG. 2 is a diagram illustrating a configuration of the inverter control unit 300 according to the first embodiment. The inverter control unit 300 includes a dq conversion unit 40, a zero-phase current calculation unit 50, a speed conversion unit 70, a current command calculation unit 10, a dq-axis current control unit 20, a zero-phase current control unit 60, a UVW conversion unit 90, and a switching signal generation unit 30.

The dq conversion unit 40 receives the three-phase currents $i_u$, $i_v$, and $i_w$ detected by the current sensor 220 and the rotor position θ detected by the position sensor 210, and outputs dq-axis current detection values $i_d$ and $i_q$.

The zero-phase current calculation unit 50 receives the three-phase currents $i_u$, $i_v$, and $i_w$, and outputs a zero-phase current detection value $i_z$ calculated on the basis of the following Expression (1).

[Math. 1]

$$i_z = \frac{i_u}{\sqrt{3}} + \frac{i_v}{\sqrt{3}} + \frac{i_w}{\sqrt{3}} \quad (1)$$

The speed conversion unit 70 receives the rotor position θ detected by the position sensor 210, and outputs an angular speed ω.

The current command calculation unit 10 calculates the dq-axis current command values $i_d^*$ and $i_q^*$ and a zero-phase current command value $i_z^*$ on the basis of the torque command value T* input from the vehicle controller and the angular speed ω.

The dq-axis current control unit 20 receives the dq-axis current command values $i_d^*$ and $i_q^*$ and the dq-axis current detection values $i_d$ and $i_q$. The dq-axis current control unit 20 calculates and outputs dq-axis voltage command values $v_d^*$ and $v_q^*$ using a proportional control, an integral control, and the like.

The zero-phase current control unit 60 receives the zero-phase current command value $i_z^*$ and the zero-phase current detection value $i_z$. The zero-phase current control unit 60 calculates and outputs a zero-phase voltage command value $v_z^*$ using the proportional control, integral control, and the like. In other words, a difference between the zero-phase current command value $i_z^*$ and the zero-phase current detection value $i_z$ is calculated, and the zero-phase voltage command value $v_z^*$ of a direction where the difference disappears is output.

The UVW conversion unit 90 receives the dq-axis voltage command values $v_d^*$ and $v_q^*$ the zero-phase voltage command value $v_z^*$, and the rotor position θ. The UVW conversion unit 90 performs a rotation coordinate transformation to calculate and output UVW-phase voltage command values $v_u^*$, $v_v^*$, and $v_w^*$. The UVW-phase voltage command values and $v_u^*$, $v_v^*$, and $v_w^*$ are values indicating output voltage pulse widths.

The switching signal generation unit 30 performs a PWM control on the inverter 100 on the basis of the UVW-phase voltage command values $v_u^*$, $v_v^*$, and $v_w^*$. Specifically, an output voltage pulse is generated to control turning-on/off of the switching elements 110a to 110d, the switching elements 111a to 111d, and the switching elements 112a to 112d. The switching signal generation unit 30 performs the PWM control on the inverter 100 by one output voltage pulse of one pulse period in general. However, in this embodiment, as described below, one output voltage pulse is divided into several pulses. The inverter 100 controls the switching element on the basis of the output voltage pulse, and drives the motor 200.

Next, the operation of the motor control system 1 in the first embodiment will be described.

Figure 3:
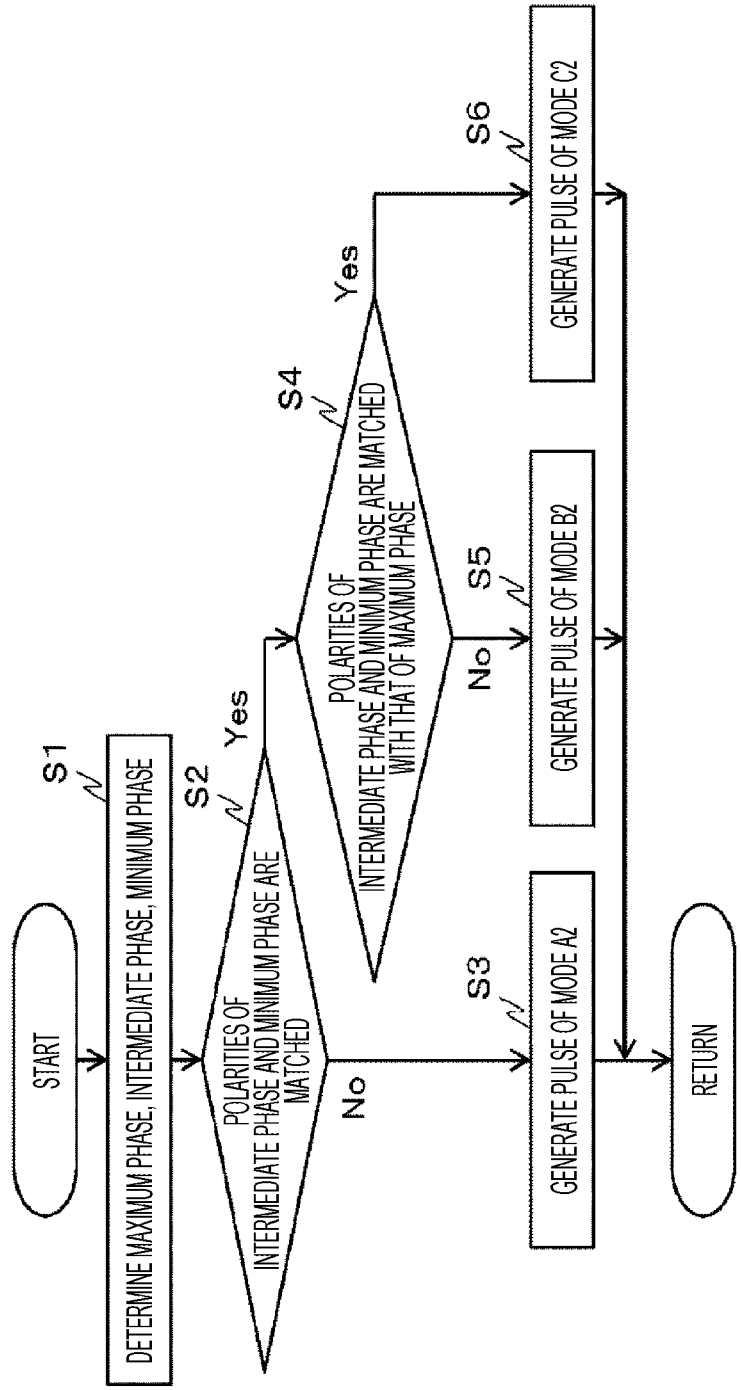
FIG. 3 is a diagram illustrating a flowchart of a switching signal generation unit in the first embodiment.

FIG. 3 is a diagram illustrating a flowchart of the switching signal generation unit 30 in the first embodiment.

In Step S1, the switching signal generation unit 30 determines a maximum phase in which an output pulse width of the voltage command value is longest, a minimum phase in which the output pulse width is shortest, and an intermediate phase therebetween on the basis of the UVW-phase voltage command values $v_u^*$, $v_v^*$, and $v_w^*$.

Next, in Step S2, it is determined whether the polarity of the voltage command value of the intermediate phase determined in Step S1 is the same as that of the voltage command value of the minimum phase. In a case where the polarity of the voltage command value of the intermediate phase is not the same as that of the voltage command value of the minimum phase, the process proceeds to Step S3.

In Step S3, the switching signal generation unit 30 generates the output voltage pulse of Mode A2 which will be described below in detail. In Mode A2, among the UVW-phase voltage command values $v_u^*$, $v_v^*$, and $v_w^*$, the output voltage pulse is divided with respect to the voltage command value of the intermediate phase or the minimum phase of which the polarity is the same as that of the voltage command value of the maximum phase. With this configuration, it is possible to output the zero-phase voltage of only any one of positive and negative polarities several times in one pulse period.

Further, the one pulse period is one pulse period of the conventional PWM control such as a triangular-wave comparison method. For example, in this embodiment, the one pulse period corresponds to a period of the output voltage pulse of the maximum phase of which the output voltage pulse is not divided.

On the other hand, in a case where the polarity of the voltage command value of the intermediate phase is the same as that of the voltage command value of the minimum phase in Step S2, the process proceeds to Step S4. In Step S4, it is determined whether the polarity of the voltage command value of the intermediate phase and the polarity of the voltage command value of the minimum phase are the same as that of the voltage command value of the maximum phase. In a case where the polarity of the voltage command value of the intermediate phase and the polarity of the voltage command value of the minimum phase are not the same as the polarity of the voltage command value of the maximum phase, the process proceeds to Step S5.

In Step S5, the switching signal generation unit 30 generates the output voltage pulse of Mode B2 which will be described below in detail. In Mode B2, the output voltage pulse of any one of the intermediate phase and the minimum phase is divided. With this configuration, the zero-phase voltage of only any one of positive and negative polarities is output several times in one pulse period.

On the other hand, in a case where the polarity of the voltage command value of the intermediate phase and the polarity of the voltage command value of the minimum phase are the same as the polarity of the voltage command value of the maximum phase in Step S4, the process proceeds to Step S6.

In Step S6, the switching signal generation unit 30 generates the output voltage pulse of Mode C2 which will be described below in detail. In Mode C2, the output voltage pulses of all the phases are divided, so that the zero-phase voltage of only any one of the positive and negative polarities is output several times in one pulse period.

FIGS. 4(a) to 4(c) are diagrams illustrating an example of the output voltage pulse of Mode A2 which is generated in Step S3. In Mode A2, with respect to the voltage command value of the intermediate phase or the minimum phase of which the polarity is the same as that of the voltage command value of the maximum phase, the output pulse width is divided.

For example, the polarity of the W-phase voltage command value which is the minimum phase illustrated in FIG. 4(c) is the same as the polarity of the U-phase voltage command value which is the maximum phase illustrated in FIG. 4(a). In this case, the output voltage pulse of the W-phase voltage command value illustrated in FIG. 4(c) is divided. Herein, one pulse period T is divided into a first half T1 and a latter half T2. In the first half T1 of one pulse period, an output start timing tw1 of the W-phase output voltage pulse illustrated in FIG. 4(c) to be divided is matched with the output start timing of the U-phase output voltage pulse illustrated in FIG. 4(a). Further, in the latter half T2 of one pulse period, an output stop timing tw2 of the W-phase output voltage pulse illustrated in FIG. 4(c) is matched with the output stop timing of the U-phase output voltage pulse illustrated in FIG. 4(a). In the undivided U-phase output voltage pulse, the output voltage pulses in the first half T1 and the latter half T2 are combined as illustrated in FIG. 4(a). Further, in the undivided V-phase output voltage pulse, the output voltage pulses in the first half T1 and the latter half T2 are combined as illustrated in FIG. 4(b).

Figure 4:
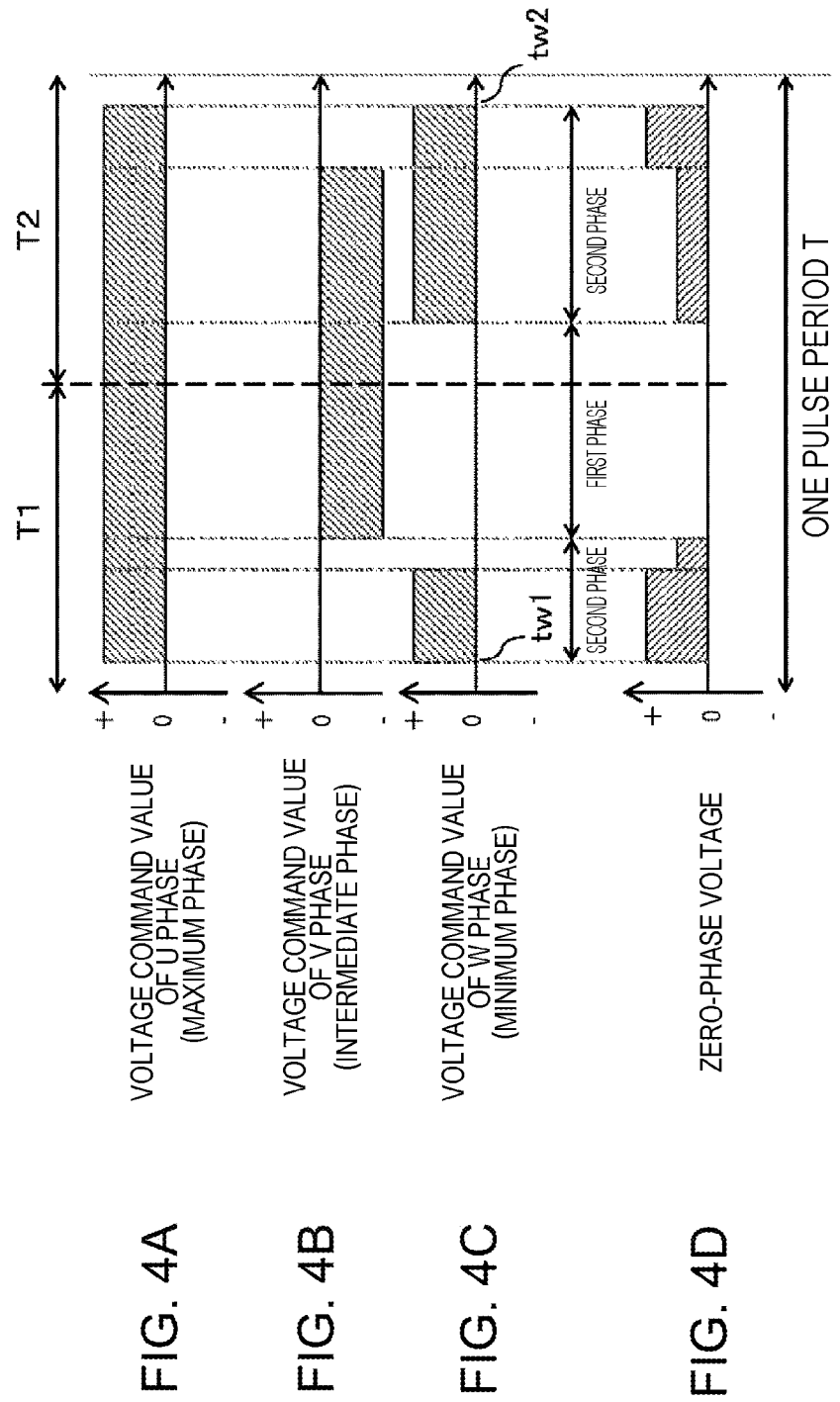
FIGS. 4A to 4D are diagrams illustrating an output voltage pulse in Mode A2.

Then, as illustrated in FIG. 4, the inverter control unit 300 generates the output voltage pulse which includes a first phase where a total sum of the output voltage pulse output to each phase of the inverter 100 becomes zero and a second phase where the total sum of the output voltage pulse output to each phase of the inverter 100 becomes positive. The second phase is divided into two phases by the first phase in one pulse period. That is, one pulse period is configured in an order of the second phase, the first phase, and the second phase. In other words, the inverter control unit divides the output voltage pulse of any phase except the widest phase of the output voltage pulse in one pulse period into several pulses in one pulse period.

As a result of outputting the output voltage pulse thus generated to the inverter 100, the motor 200 outputs the zero-phase voltage having only the positive polarity two times in one pulse period as illustrated in FIG. 4(d). Further, the description in this embodiment has been given about an example that the zero-phase voltage is output two times. For example, the zero-phase voltage of only any one of positive and negative polarities may be output several times in one pulse period by dividing one pulse period T into a plurality of periods to divide the output voltage pulse.

FIGS. 5(a) to 5(c) are diagrams illustrating an example of the output voltage pulse of Mode B2 generated in Step S5. In Mode B2, one of the output voltage pulses of the intermediate phase and the minimum phase is divided to output the zero-phase voltage of only one of the positive and negative polarities is output in one pulse period several times. If the output voltage pulse of the minimum phase is divided, the pulse width may become narrow as the inverter 100 is hard to output. In order to prevent the problem, herein, the output voltage pulse of the intermediate phase of which the pulse width is wider as illustrated in FIG. 5(b) is divided. In FIGS. 5(a) to 5(c), the maximum phase is the U phase, the intermediate phase is the V phase, and the minimum phase is the W phase. Therefore, similarly to the process of Step S3, the output start timing of the divided V-phase output voltage pulse is matched with the output start timing of the U-phase output voltage pulse in the first half T1 of one pulse period T. In the latter half, the output stop timing of the V-phase output voltage pulse is matched with the output stop timing of the U-phase output voltage pulse. In the undivided U and W phases, the output voltage pulses in the first half T1 and the latter half T2 are combined.

Figure 5:
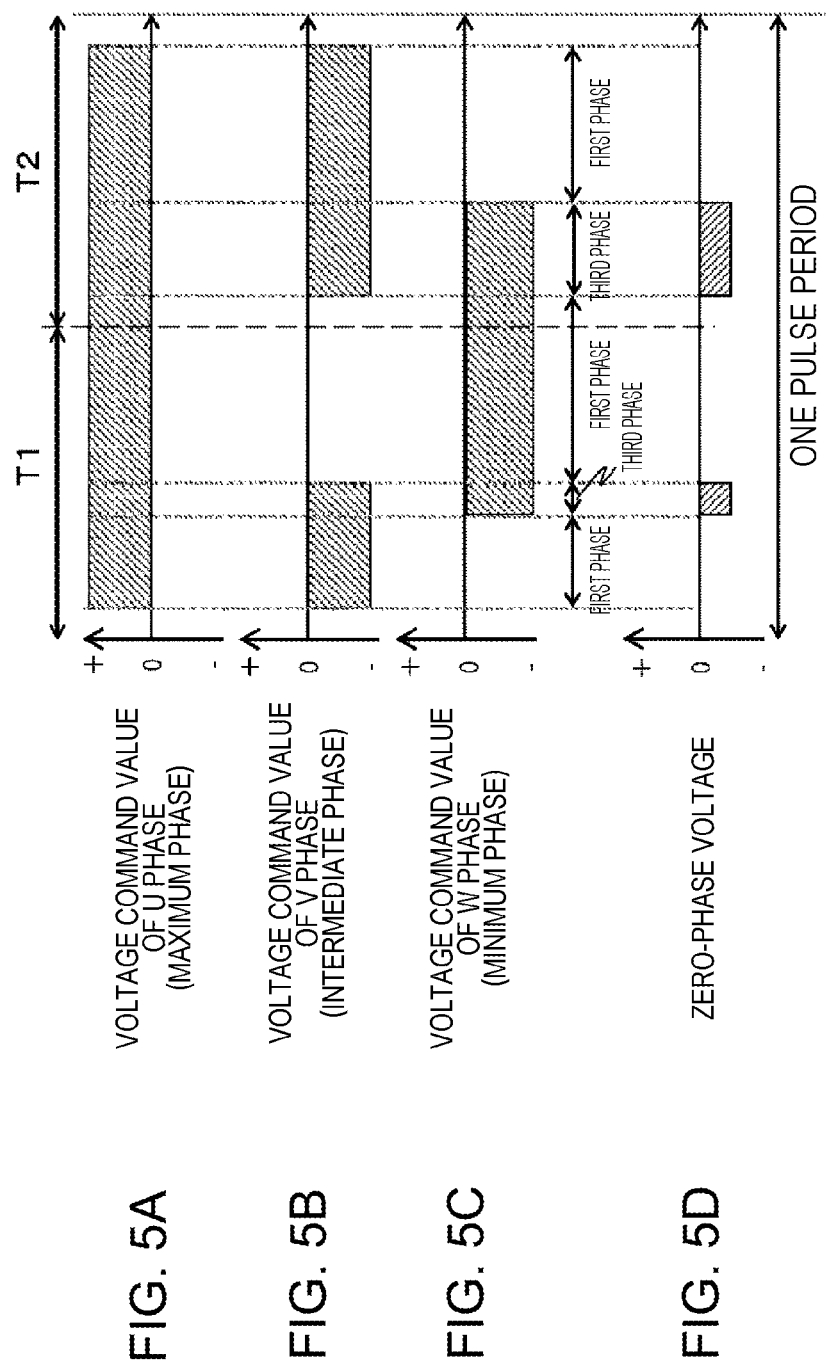
FIGS. 5A to 5D are diagrams illustrating the output voltage pulse in Mode B2.

Then, as illustrated in FIG. 5, the inverter control unit 300 generates the output voltage pulse which includes a first phase where the total sum of the output voltage pulse output to each phase of the inverter 100 becomes zero and a third phase where the total sum of the output voltage pulse output to each phase of the inverter 100 becomes negative. The third phase is divided into three phases by the first phase in one pulse period. In other words, one pulse period is configured in an order of the first phase, the third phase, the first phase, the third phase, and the first phase. In other words, the inverter control unit divides the output voltage pulse of any phase except the widest phase of the output voltage pulse in one pulse period into several pulses in one pulse period.

As a result of outputting the output voltage pulse thus generated to the inverter 100, the zero-phase voltage of only the negative polarity is output two times in one pulse period in the motor 200 as illustrated in FIG. 5(*d*).

Figure 6:
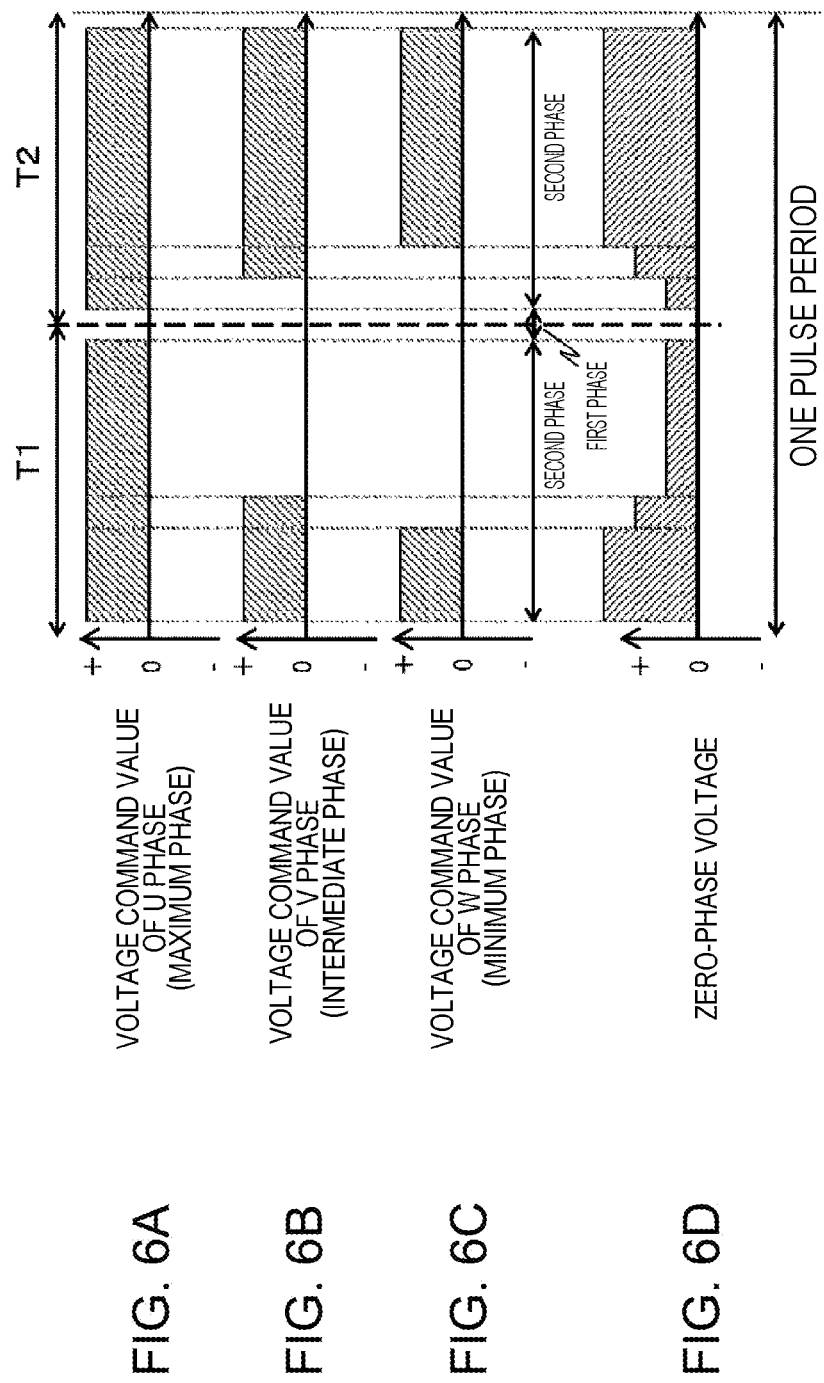
FIGS. 6A to 6D are diagrams illustrating the output voltage pulse in Mode C2.

FIGS. 6(*a*) to 6(*c*) are diagrams illustrating an example of the output voltage pulse of Mode C2 generated in Step S6. In Mode C2, the output voltage pulses of all the phases are divided, so that the zero-phase voltage of only any one of the positive and negative polarities is output several times in one pulse period. In FIGS. 6(*a*) to 6(*c*), the maximum phase is the U phase, the intermediate phase is the V phase, and the minimum phase is the W phase. However, the output start timings of the divided U, V, and W-phase output voltage pulses are matched to the output start timing of the U-phase output voltage pulse in the first half T1 of one pulse period T. In the latter half, the output stop timings of the U, V, and W-phase output voltage pulses are matched with the output stop timing of the U-phase output voltage pulse.

Then, as illustrated in FIG. 6, the inverter control unit 300 generates the output voltage pulse which includes a first phase where the total sum of the output voltage pulse output to each phase of the inverter 100 becomes zero and a second phase where the total sum of the output voltage pulse output to each phase of the inverter 100 becomes positive. The second phase is divided into two phases by the first phase in one pulse period. That is, one pulse period is configured in an order of the second phase, the first phase, and the second phase. In other words, the inverter control unit divides the output voltage pulse of any phase except the widest phase of the output voltage pulse in one pulse period into several pulses in one pulse period.

As a result of outputting the output voltage pulse thus generated to the inverter 100, the motor 200 outputs the zero-phase voltage having only the positive polarity two times in one pulse period as illustrated in FIG. 6(*d*).

According to this embodiment, the zero-phase voltage is output several times in one pulse period, so that the control period of the zero-phase current is shortened to reduce ripples of the zero-phase current.

Second Embodiment

Figure 7:
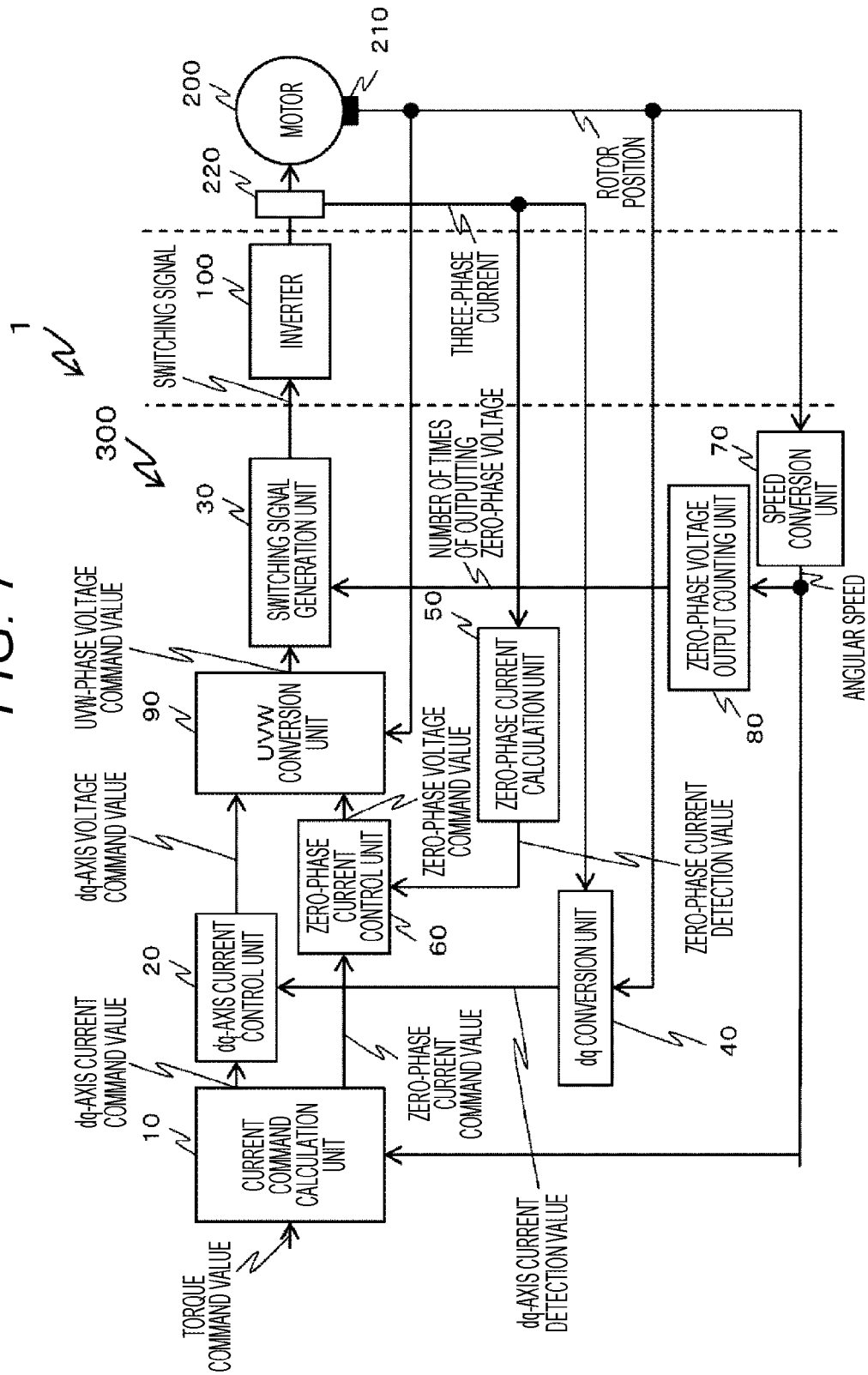
FIG. 7 is a diagram illustrating a configuration of the inverter control unit according to a second embodiment.

FIG. 7 is a diagram illustrating a configuration of the inverter control unit 300 according to a second embodiment. The configuration of the motor control system 1 is similar to that according to the first embodiment illustrated in FIG. 1, and the description thereof will be omitted. Hereinafter, the second embodiment will be described with reference to FIGS. 7 to 11.

In the second embodiment, the inverter control unit 300 newly includes a zero-phase voltage output counting unit 80, and the other configurations are similar to those according to the first embodiment illustrated in FIG. 2, and the description thereof will be omitted.

The zero-phase voltage output counting unit 80 calculates the number of zero-phase voltages which are output in one pulse period on the basis of the angular speed ω output by the speed conversion unit 70. In a case where the angular speed ω is low, the frequency of a driving current flowing to the motor is low, and the frequency of the zero-phase current is also low. Therefore, only one zero-phase voltage may be output in one pulse period. On the other hand, in a case where the angular speed ω is high, the frequency of the zero-phase current is high. Therefore, the number of times of outputting the zero-phase voltage is necessarily increased. The number of times of outputting the zero-phase voltage is different depending on a motor. Therefore, the number of times of outputting the zero-phase voltage is calculated with reference to table data which is predetermined for each motor, and the like. The switching signal generation unit 30 generates the output voltage pulse on the basis of the calculated number of times of outputting the zero-phase voltage.

Figure 8:
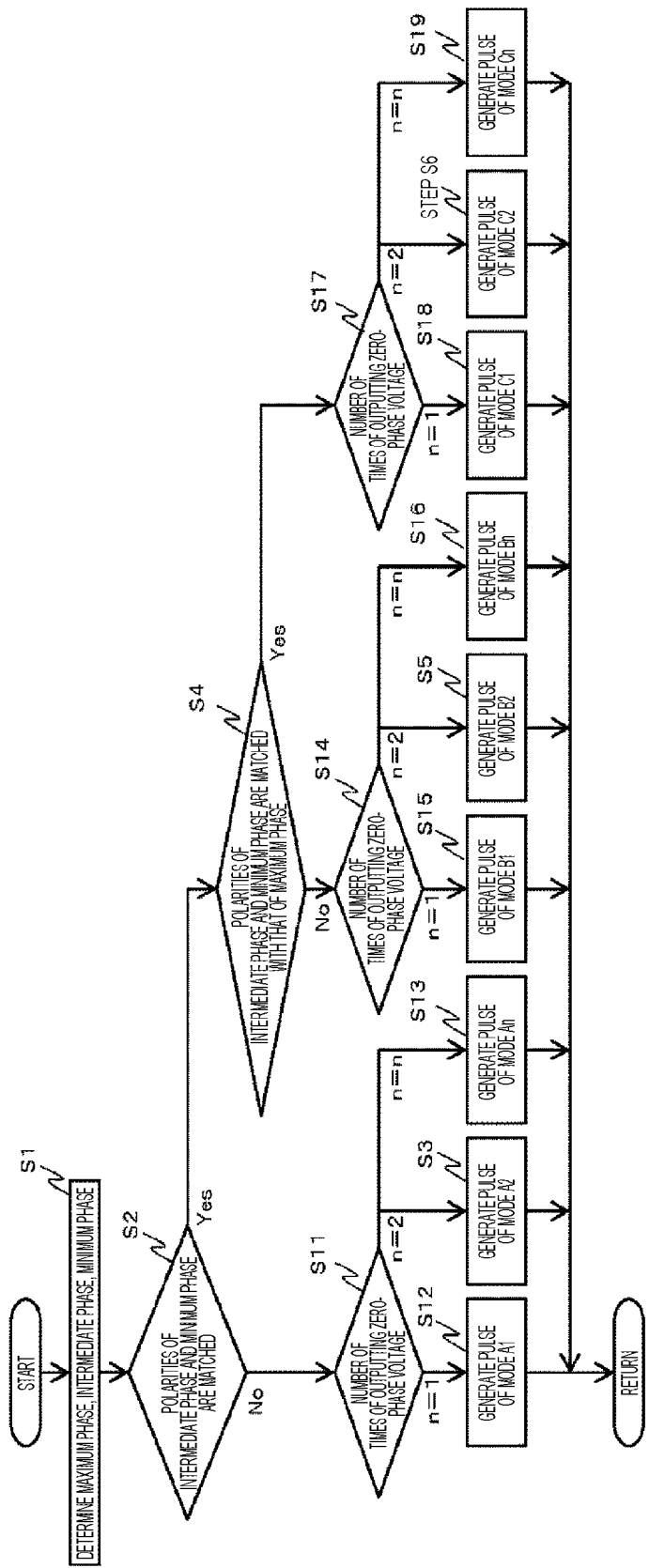
FIG. 8 is a diagram illustrating a flowchart of the switching signal generation unit in the second embodiment.

FIG. 8 is a diagram illustrating a flowchart of the switching signal generation unit 30 in the second embodiment. The same process as that in the flowchart of the switching signal generation unit 30 in the first embodiment will be attached with the same symbol, and the description thereof will be omitted.

The switching signal generation unit 30 determines, first in Step S1, the maximum phase where the output pulse width of the voltage command value is longest, the minimum phase where the output pulse width of the voltage command value is shortest, and the intermediate phase therebetween.

Next, in Step S2, it is determined whether the polarity of the voltage command value of the intermediate phase is the same as the polarity of the voltage command value of the minimum phase. In a case where the polarity of the voltage command value of the intermediate phase is not the same as that of the voltage command value of the minimum phase, the number of times of outputting the zero-phase voltage from the zero-phase voltage output counting unit 80 is determined in Step S11.

In Step S11, in a case where the number of times of outputting the zero-phase voltage is 1, the process proceeds to Step S12, and the output voltage pulse of Mode A1 is generated. In Mode A1, the zero-phase voltage is output one time in one pulse period.

Figure 9:
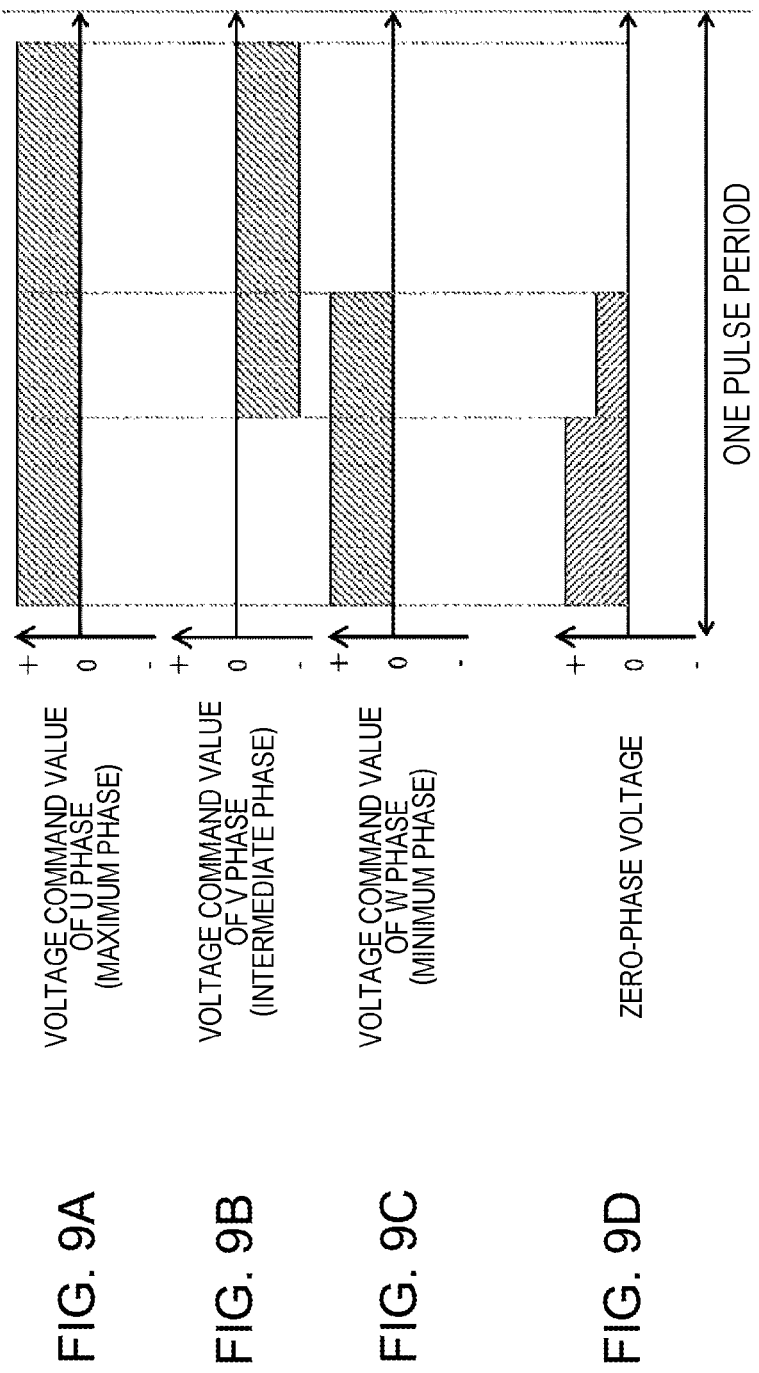
FIGS. 9A to 9D are diagrams illustrating the output voltage pulse in Mode A1.

FIGS. 9(*a*) to 9(*c*) are diagrams illustrating an example of the output voltage pulse of Mode A1 which is generated in the switching signal generation unit 30. In Mode A1, the number of times of outputting the zero-phase voltage is 1, and thus the voltage command value is not divided. As a result, in Mode A1, the output voltage pulse corresponding to the first half T1 of Mode A2 illustrated in FIG. 4 is generated. In other words, in the output voltage pulse illustrated in FIG. 9, the output start timings of the pulses of the W phase (the minimum phase illustrated in FIG. 9(*c*)) and the U phase (the maximum phase illustrated in FIG. 9(*a*)) are matched. The output stop timings of the pulses of the V phase (the intermediate phase illustrated in FIG. 9(*b*)) and the U phase (the maximum phase illustrated in FIG. 9(*a*)) are matched.

As a result of outputting the output voltage pulse thus generated to the inverter 100, the motor 200 outputs the zero-phase voltage having only the positive polarity one time in one pulse period as illustrated in FIG. 9(*d*).

In Step S11, in a case where the number of times of outputting the zero-phase voltage is 2, the output voltage pulse of Mode A2 is generated in Step S4. In Mode A2, the zero-phase voltage of only the positive polarity is output two times in one pulse period as described with reference to FIG. 4 in the first embodiment.

In Step S11, in a case where the number of times of outputting the zero-phase voltage is n times (n≥3), the output voltage pulse of Mode An is generated in Step S13. in Mode An, the output voltage pulse is generated such that the zero-phase voltage of only any one of positive and negative polarities is output n times in one pulse period by dividing one pulse period T into a plurality of periods to divide the output voltage pulse. Specifically, one pulse period T is divided into a plurality of sections Tn. Then, in the plurality of divided sections Tn, the output voltage pulse is generated by a method similar to that of the first half T1 or the latter half T2 of Mode A2. As a result, a plurality of divided output voltage pulses are generated.

On the other hand, in a case where the polarity of the voltage command value of the intermediate phase is the same as that of the voltage command value of the minimum phase in Step S2, the process proceeds to Step S4. In Step S4, it is determined whether the polarity of the voltage command value of the intermediate phase and the polarity of the voltage command value of the minimum phase are the same as that of the voltage command value of the maximum phase. In a case where the polarity of the voltage command value of the intermediate phase and the polarity of the voltage command value of the minimum phase are not the same as the polarity of the voltage command value of the maximum phase, the number of times of outputting the zero-phase voltage from the zero-phase voltage output counting unit 80 is determined in Step S14.

In Step S14, in a case where the number of times of outputting the zero-phase voltage is 1, the output voltage pulse of Mode B1 is output in Step S15. In Mode B1, the zero-phase voltage is output only one time in one pulse period.

Figure 10:
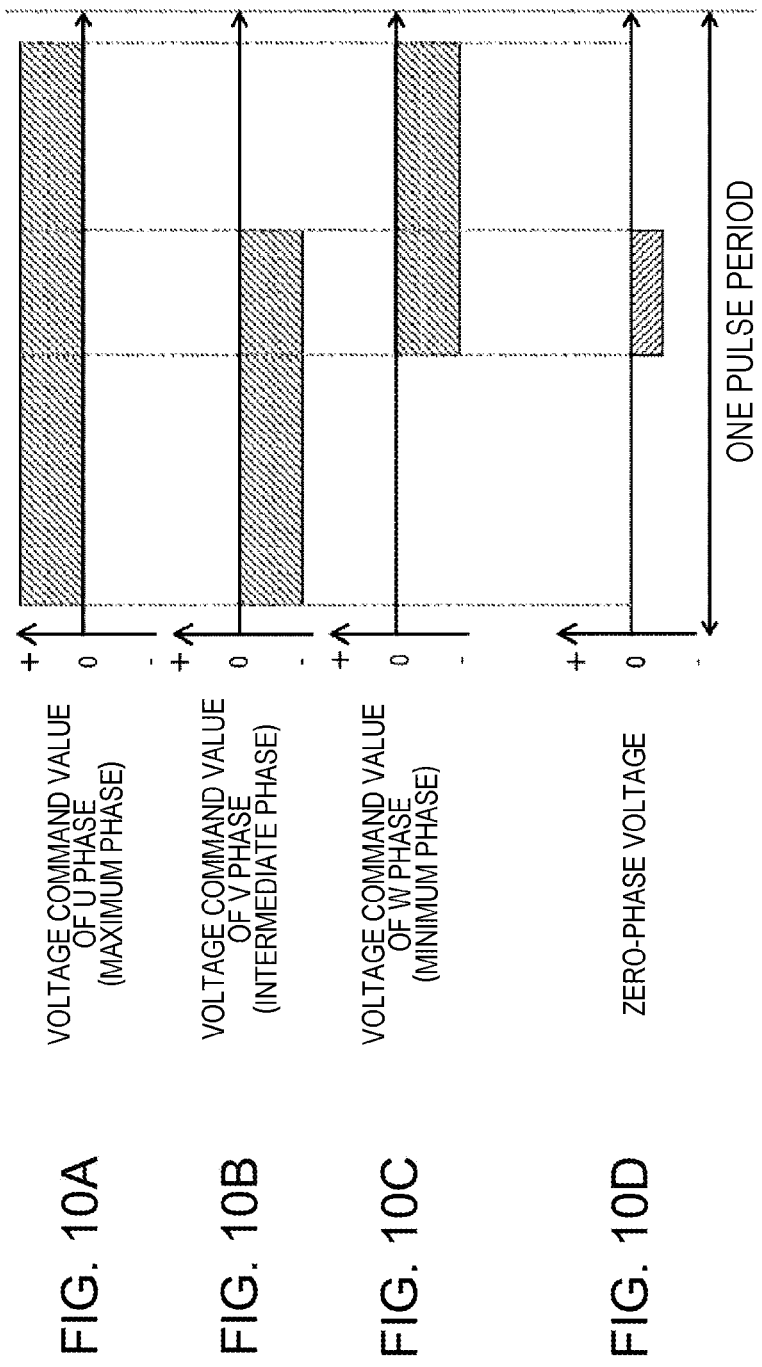
FIGS. 10A to 10D are diagrams illustrating the output voltage pulse in Mode B1.

FIGS. 10(*a*) to 10(*c*) are diagrams illustrating an example of the output voltage pulse of Mode B1 which is generated in the switching signal generation unit 30. In Mode B1, the number of times of outputting the zero-phase voltage is 1, and thus the voltage command value is not divided. As a result, in Mode B1, the output voltage pulse corresponding to the first half T1 of Mode B2 illustrated in FIG. 5 is generated. In other words, in the output voltage pulse illustrated in FIG. 10, the output start timings of the pulses of the V phase (the intermediate phase illustrated in FIG. 10(*b*)) and the U phase (the maximum phase illustrated in FIG. 10(*a*)) are matched. The output stop timings of the pulses of the W phase (the minimum phase illustrated in FIG. 10(*c*)) and the U phase (the maximum phase illustrated in FIG. 10(*a*)) are matched.

As a result of outputting the output voltage pulse thus generated to the inverter 100, the zero-phase voltage of only the negative polarity is output one time in one pulse period in the motor 200 as illustrated in FIG. 10(*d*).

In Step S14, in a case where the number of times of outputting the zero-phase voltage is 2, the output voltage pulse of Mode B2 is generated in Step S5. In Mode B2, the zero-phase voltage of only the negative polarity is output two times in one pulse period as described with reference to FIG. 5 in the first embodiment.

In Step S14, in a case where the number of times of outputting the zero-phase voltage is n times (n≥3), the output voltage pulse of Mode Bn is generated in Step S16. in Mode Bn, the output voltage pulse is generated such that the zero-phase voltage of only any one of positive and negative polarities is output n times in one pulse period by dividing one pulse period T into a plurality of periods to divide the output voltage pulse.

In a case where the polarity of the voltage command value of the intermediate phase and the polarity of the voltage command value of the minimum phase are the same as the polarity of the voltage command value of the maximum phase in Step S4, the process proceeds to Step S17. In Step S17, the number of times of outputting the zero-phase voltage from the zero-phase voltage output counting unit 80 is determined.

In Step S17, in a case where the number of times of outputting the zero-phase voltage is 1, the output voltage pulse of Mode C1 is output in Step S18. In Mode C1, the zero-phase voltage is output only one time in one pulse period.

Figure 11:
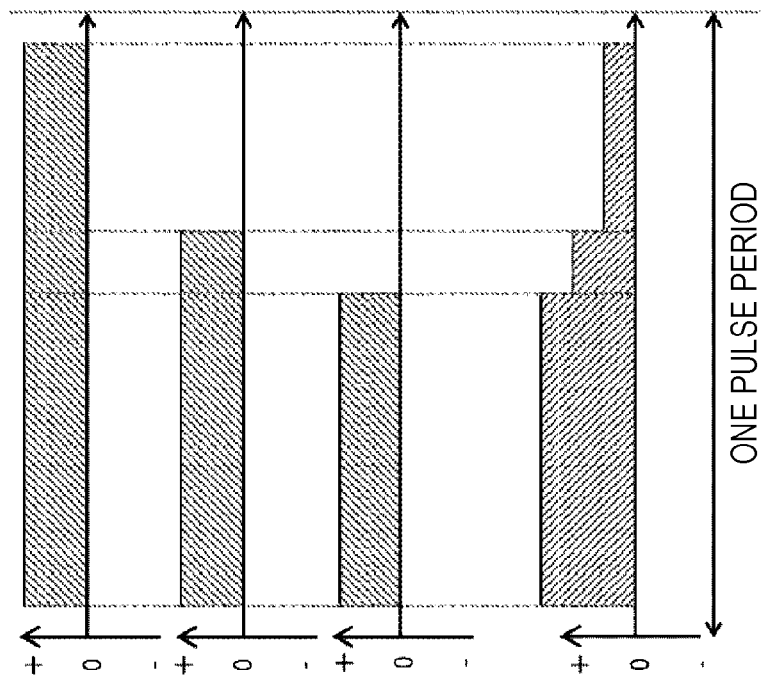
FIGS. 11A to 11D are diagrams illustrating the output voltage pulse in Mode C1.

FIGS. 11(*a*) to 11(*c*) are diagrams illustrating an example of the output voltage pulse of Mode C1 which is generated in the switching signal generation unit 30. In Mode C1, the number of times of outputting the zero-phase voltage is 1, and thus the voltage command value is not divided. As a result, in Mode C1, the output voltage pulse corresponding to the first half T1 of Mode C2 illustrated in FIG. 6 is generated.

As a result of outputting the output voltage pulse thus generated to the inverter 100, the motor 200 outputs the zero-phase voltage having only the positive polarity once in one pulse period as illustrated in FIG. 11(*d*).

In Step S17, in a case where the number of times of outputting the zero-phase voltage is 2, the output voltage pulse of Mode C2 is generated in Step S6. In Mode C2, the zero-phase voltage of only the positive polarity is output two times in one pulse period as described with reference to FIG. 6 in the first embodiment.

In Step S17, in a case where the number of outputting the zero-phase voltages is n times (n≥3), the output voltage pulse of Mode Cn is generated in Step S19. in Mode Cn, the output voltage pulse is generated such that the zero-phase voltage of only any one of positive and negative polarities is output n times in one pulse period by dividing one pulse period T into a plurality of periods to divide the output voltage pulse.

According to this embodiment, according to the number of detected zero-phase voltages, the zero-phase voltage is output several times in one pulse period, so that the control period of the zero-phase current is shortened to reduce ripples of the zero-phase current.

Third Embodiment

Figure 12:
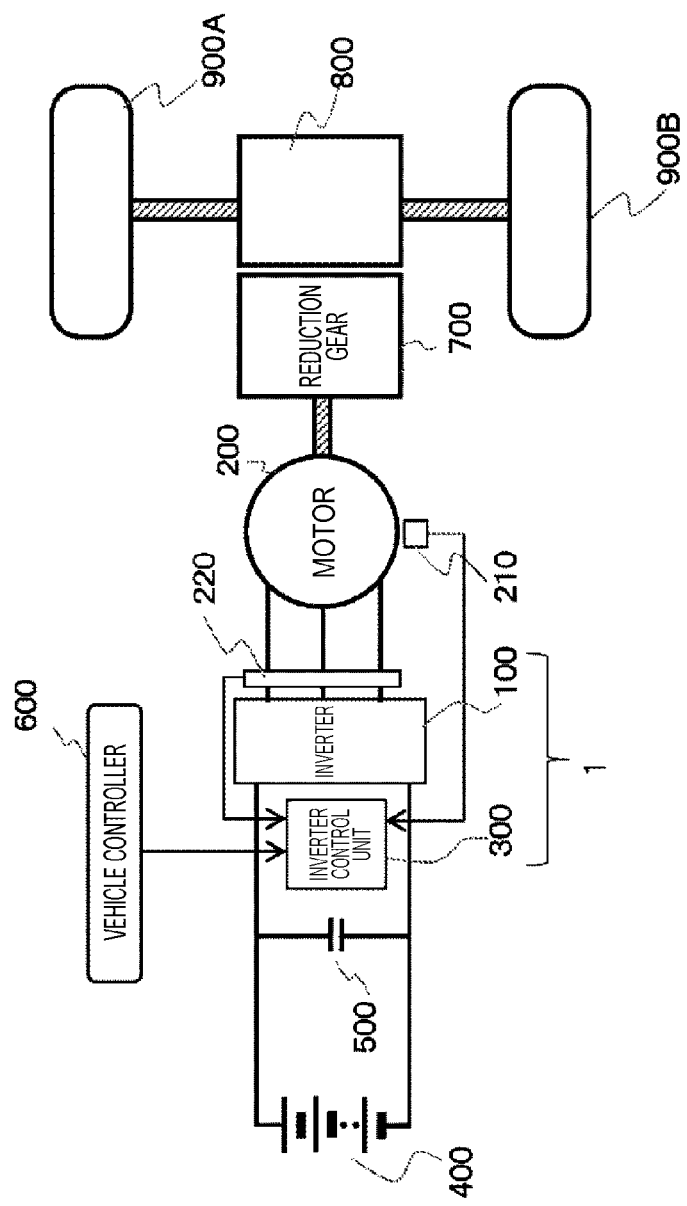
FIG. 12 is a block diagram illustrating a configuration of an electric vehicle.

FIG. 12 is a block diagram illustrating a configuration of an electric vehicle. The electric vehicle includes the motor control system 1 described in the first embodiment or the second embodiment. In the inverter 100, a DC voltage is supplied from a DC power source 400 through a capacitor 500. In the inverter control unit 300, the torque command value is input from a vehicle controller 600.

The electric vehicle is an electric automobile, and an axial output torque of the motor 200 is transferred to right and left driving wheels 900A and 900B through a reduction gear 700 and a differential gear 800. Further, the electric vehicle may be a hybrid automobile.

According to this embodiment, in the electric vehicle which includes the motor control system, the zero-phase voltage is output several times in one pulse period, so that the control period of the zero-phase current is shortened to reduce ripples of the zero-phase current.

According to the above embodiment, the following operational effects are obtained.

(1) The motor control system 1 includes the inverter 100 which drives the motor 200 which includes windings separately wound around phases, and the inverter control unit 300 which generates the output voltage pulse corresponding to each phase to control the inverter 100 on the basis of the torque command value and the rotor position of the motor 200. The inverter control unit 300 divides the output voltage pulse of at least one phase of the output voltage pulses into several pulses during one pulse period of the output voltage pulse such that the zero-phase voltage of only one of the positive and negative polarities is output several times from the motor 200 in the one pulse period. With this configuration, the zero-phase voltage is output several times in one pulse period. Therefore, it is possible to suppress ripples generated in the zero-phase current so as to reduce a loss.

(2) In the motor control system 1, the inverter control unit 300 generates the output voltage pulse to include the first phase in which the total sum of the output voltage pulse output to each phase of the inverter 100 becomes zero, the second phase in which the total sum of the output voltage pulse output to each phase of the inverter 100 becomes positive, and the third phase in which the total sum of the output voltage pulse output to each phase of the inverter 100 becomes negative. The output voltage pulse divides the second phase or the third phase into several phases by the first phase in one pulse period. With this configuration, the zero-phase voltage is output several times in one pulse period. Therefore, it is possible to suppress ripples generated in the zero-phase current so as to reduce a loss.

(3) In the motor control system 1, the inverter control unit 300 divides the output voltage pulse of any phase except the widest phase of the output voltage pulse in one pulse period into several phases during one pulse period. With this configuration, the zero-phase voltage is output several times in one pulse period. Therefore, it is possible to suppress ripples generated in the zero-phase current so as to reduce a loss.

(4) In the motor control system 1, the inverter control unit 300 generates the output voltage pulse such that the number of zero-phase voltages output in one pulse period is changed on the basis of the angular speed of the motor 200. With this configuration, according to the number of detected zero-phase voltages, the zero-phase voltage is output several times in one pulse period, so that the control period of the zero-phase current is shortened to reduce ripples of the zero-phase current.

(5) The electric vehicle includes the motor control system 1 and the motor 200 which is driven by the motor control system 1. With this configuration, in the electric vehicle which includes the motor control system, the zero-phase voltage is output several times in one pulse period, so that the control period of the zero-phase current is shortened to reduce ripples of the zero-phase current.

MODIFICATIONS

The invention may be implemented by modifying the above-described first to third embodiments as follows.

(1) In the first to third embodiments, the motor control system which drives a three-phase motor has been described. The invention may be applied to a motor control system which drives a motor which has a plurality of phases.

The invention is not limited to the above embodiments, and includes other forms considered within the scope of the technical ideas of the invention as long as the features of the invention are not degraded. In addition, the above embodiments and the modifications may be combined.

REFERENCE SIGNS LIST 1 motor control system
10 current command calculation unit
20 dq-axis current control unit
30 switching signal generation unit
40 dq conversion unit
50 zero-phase current calculation unit
60 zero-phase current control unit
70 speed conversion unit
80 zero-phase voltage output counting unit
90 UVW conversion unit
100 inverter
110 U-phase full-bridge inverter
110a switching element
110b switching element
110c switching element
110d switching element
111 V-phase full-bridge inverter
110a switching element
110b switching element
110c switching element
110d switching element
112 W-phase full-bridge inverter
112a switching element
112b switching element
112c switching element
112d switching element
200 motor
210 position sensor
220 current sensor
300 inverter control unit
400 DC power source
500 capacitor
600 vehicle controller

The invention claimed is:

1. A motor control system, comprising:
an inverter which drives a motor which includes windings separately wound around each phase; and
an inverter control unit which generates an output voltage pulse corresponding to each phase to control the inverter based on a torque command value and a rotor position of the motor,
wherein
the inverter control unit divides the output voltage pulse of at least one phase of the output voltage pulses into several pulses during one pulse period of the output voltage pulse such that a zero-phase voltage of only one of positive and negative polarities is output several times from the motor in the one pulse period.

2. The motor control system according to claim 1, wherein the inverter control unit generates the output voltage pulse to include a first phase in which a total sum of the output voltage pulse output to each phase of the inverter becomes zero, a second phase in which the total sum of the output voltage pulse output to each phase of the inverter becomes positive, and a third phase in which the total sum of the output voltage pulse output to each phase of the inverter becomes negative, and the output voltage pulse divides the second phase or the third phase into several phases by the first phase in the one pulse period.

3. The motor control system according to claim 1, wherein the inverter control unit divides the output voltage pulse of any phase except a widest phase of the output voltage pulse in the one pulse period into several pulses in the one pulse period.

4. The motor control system according to claim 1, wherein the inverter control unit generates the output voltage pulse such that a number of zero-phase voltages output in the one pulse period is changed based on an angular speed of the motor.

5. An electric vehicle, comprising:
the motor control system according to claim 1; and
the motor which is driven by the motor control system.

* * * * *